(12) United States Patent
Lee (10) Patent No.: US 7,940,149 B2
(45) Date of Patent: May 10, 2011

(54) MAGNETIC CHUCK

(76) Inventor: Yong Goo Lee, Sungnam-si (KR)

(*) Notice: Subject to any disclaimer, the term of this patent is extended or adjusted under 35 U.S.C. 154(b) by 379 days.

(21) Appl. No.: 12/298,235

(22) PCT Filed: Apr. 24, 2007

(86) PCT No.: PCT/KR2007/001994
§ 371 (c)(1),
(2), (4) Date: Oct. 23, 2008

(87) PCT Pub. No.: WO2007/123358
PCT Pub. Date: Nov. 1, 2007

(65) Prior Publication Data
US 2009/0184789 A1    Jul. 23, 2009

(30) Foreign Application Priority Data
Apr. 24, 2006 (KR) .................. 10-2006-0036582

(51) Int. Cl.
*H01F 7/20* (2006.01)
(52) U.S. Cl. .................. 335/289; 335/294; 269/8
(58) Field of Classification Search .......... 335/285–295; 269/8
See application file for complete search history.

(56) References Cited

U.S. PATENT DOCUMENTS

| 3,477,050 | A | * | 11/1969 | Hinger | 335/285 |
| 4,090,162 | A | * | 5/1978 | Cardone et al. | 335/289 |
| 4,356,467 | A | * | 10/1982 | Cardone et al. | 335/295 |
| 4,507,635 | A | * | 3/1985 | Cardone et al. | 335/291 |
| 4,575,702 | A |   | 3/1986 | Nitta et al. |   |
| 4,847,582 | A | * | 7/1989 | Cardone et al. | 335/289 |
| 4,956,625 | A | * | 9/1990 | Cardone et al. | 335/290 |
| 4,965,695 | A | * | 10/1990 | Baumann | 361/142 |
| 7,038,566 | B2 | * | 5/2006 | Cardone | 335/289 |

FOREIGN PATENT DOCUMENTS

| KR | 1020020035935 | 5/2002 |
| KR | 1020050087153 | 8/2005 |

* cited by examiner

*Primary Examiner* — Ramon M Barrera
(74) *Attorney, Agent, or Firm* — Park & Associates IP Law P.C.

(57) ABSTRACT

The present invention is a magnetic chuck that is chiefly used for machining tools. The magnetic chuck has a structure in which an accommodation hole (110a) is formed to pass through a chuck main body (110), a first magnetic element (141) is exposed in the direction of the top surface of the chuck main body (110), and an AlNiCo magnet (120) is exposed in the direction of the bottom surface of the chuck main body (110), so that respective objects (200 and 300) to be attached can be attached to two opposite surfaces of the magnetic chuck (100), with the result that the magnetic chuck (100) can be used in various ways. Furthermore, the lateral part (112) of the chuck main body (110) is not unnecessary, so that the weight of the magnetic chuck (100) itself is greatly reduced and thus the product cost is reduced, the thickness of the magnetic chuck (100) is reduced, and convenience of use can be greatly improved.

5 Claims, 11 Drawing Sheets

MAGNETIC CHUCK

TECHNICAL FIELD

The present invention relates to a magnetic chuck that is used for machining tools, and, more particularly, to a magnetic chuck that can be used in various ways as needed.

BACKGROUND ART

As is well known, the chucks of machining tools are components that are each installed at one end of the main spindle of a machining tool and holds a workpiece, and are classified into general chucks, such as an independent chuck, a universal chuck and a combination chuck, a compressed air chuck, a collet chuck, and a magnetic chuck.

Of these chucks, the magnetic chuck has an advantage in that it enables a workpiece to be attached and fastened thereto without requiring the use of a separate element, but has disadvantages in that it cannot be applied to a workpiece made from non-magnetic material and in that demagnetization must be performed after processing because the workpiece remains magnetized.

Recently, a magnetic chuck, which is formed by combining an AlNiCo magnet having high residual magnetization, and a ferrite (or rare-earth) magnet having very high coercive force and magnetizing force, has been proposed. Such a magnetic chuck has a very excellent workpiece fastening function because it generates a very high magnetic force.

Figure 1:
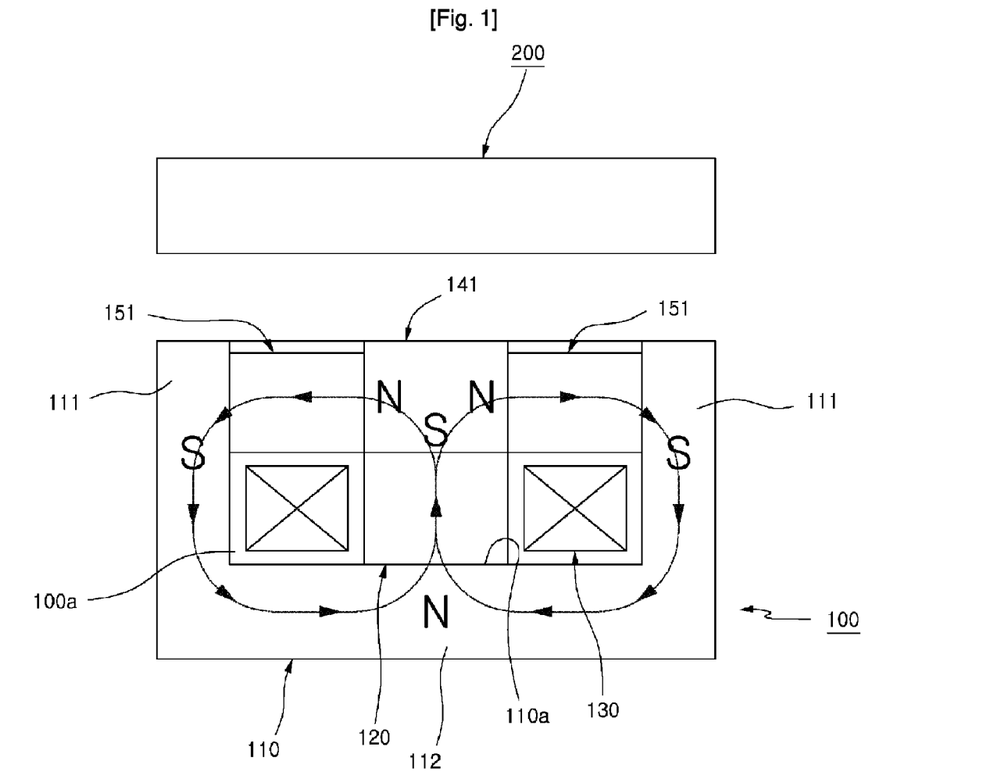
FIGS. 1 and 2 are diagrams showing a conventional magnetic chuck.
Figure 2:
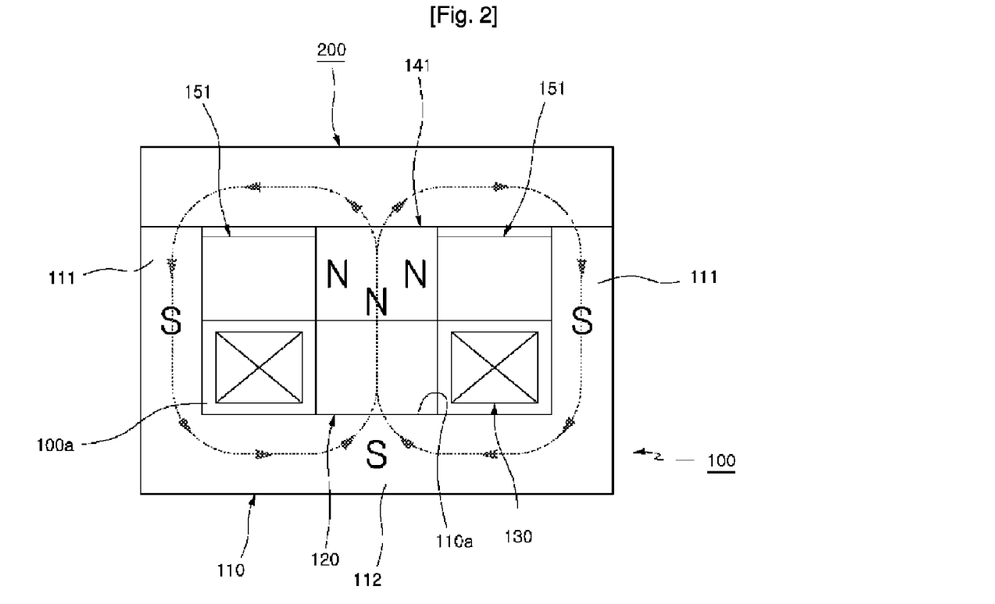

FIGS. 1 and 2 show a conventional magnetic chuck having an AlNiCo magnet and a ferrite (or rare-earth) magnet.

Referring to the drawings, the conventional magnetic chuck 100 includes a chuck main body 110 made of magnetic material and provided with an accommodation hole 110a; an AlNiCo magnet 120 inserted into the accommodation hole 110a of the chuck main body 110; a coil 130 inserted into the accommodation hole 110a of the chuck main body 110 and configured to surround the AlNiCo magnet 120; a first magnetic element 141 inserted into the accommodation hole 110a of the chuck main body 110 and disposed above and adjacent to the AlNiCo magnet 120; and a first ferrite (or rare-earth) magnet 151 inserted into the accommodation hole 110a of the chuck main body 110 and disposed adjacent to the circumferential surface of the first magnetic element 141. Furthermore, the conventional magnetic chuck 100 has a structure in which the elements 120, 130, 141 and 151, inserted into the accommodation hole 110a of the chuck main body 110, are bound together by filling material 100a, and are mounted in the accommodation hole 110a of the chuck main body 110.

The polarity of the AlNiCo magnet 120 is changed according to the direction in which power is supplied through the coil 130.

It is preferred that ferromagnetism material, such as iron, cobalt or nickel, be used for the first magnetic element 141.

The filling material 100a is flowable curing material, that is, insulating material, which allows magnetic force to freely pass therethrough, and is charged into gaps between the chuck main body 110 and the elements 120, 130, 141 and 151, which are inserted into the accommodation hole 110a of the chuck main body 110, thus allowing these elements 120, 130, 141 and 151 to be bound together.

The operation of the conventional magnetic chuck 100 is described with reference to FIGS. 1 and 2 below.

As shown in FIG. 1, when power is applied to the coil 130, and the AlNiCo magnet 120 is thus magnetized, the vertical part 111 of the chuck main body 110, which is adjacent to the first ferrite (or rare-earth) magnet 151, are magnetized to become an S-pole, and the lateral part 112 of the chuck main body 110, which is adjacent to the AlNiCo magnet 120, is magnetized to become an N-pole, so that a closed loop is formed such that a line of magnetic force extends along the direction of the first magnetic element 141→the first ferrite (or rare-earth) magnet 151→the chuck main body 110→the AlNiCo magnet 120→the first magnetic element 141. Accordingly, when the closed loop is formed by the line of magnetic force as shown in FIG. 1, an object 200 to be attached is disposed outside the line of magnetic force that forms the closed-loop, so that the object 200 to be attached is not attached to the magnetic chuck 100 even when the object 200 to be attached, such as a workpiece, is close to or in contact with the top surface of the magnetic chuck 100.

In this state, when power is applied to the coil 130 in a reverse direction, the AlNiCo magnet 120 is inversely magnetized, so that all portions of the magnetic element 141 are changed into an N-pole, and both the vertical part 111 and lateral part 112 of the chuck main body 110 are changed into an S-pole. Accordingly, when the object 200 to be attached, such as a workpiece, is close to the top surface of the magnetic chuck 100, the object 200 to be attached is attached to the vertical part 111 of the chuck main body, which has an S polarity, and the first magnetic element 141, which has an N polarity. When the object 200 to be attached has been attached to the top surface of the magnetic chuck 100 by magnetic force, a closed loop is formed such that a line of magnetic force extends along the direction of the first magnetic element 141→the attached object 200→the chuck main body 110→the AlNiCo magnet 120→the first magnetic element 141.

However, in the conventional magnetic chuck 100, the accommodation hole 110a of the chuck main body 110, in which the individual elements 120, 130, 141 and 151 are mounted, is formed in the form of a depression opened in an upper direction, and the elements 120, 130, 141 and 151 are inserted into the accommodation hole 110a and are laid on the lateral part 112 of the chuck main body 110 to be fixed, so that an object 300 to be attached (refer to FIG. 3) is not attached to the lateral part 112 of the chuck main body 110 even when the object 300 to be attached is close to or in contact with the lateral part 112 of the chuck main body 110.

As described above, the conventional magnetic chuck 100 is problematic in that the availability thereof is low because the object 200 to be attached can be attached only to one surface thereof, the weight of the magnetic chuck 100 itself is heavy due to the lateral part 112 of the chuck main body 110, and the magnetic chuck 100 is thick.

DISCLOSURE OF INVENTION

Technical Problem

Accordingly, the present invention has been made to solve the above problems, and an object of the present invention is to provide a magnetic chuck which is not only light but also thin, and which enables respective objects to be attached to be attached and fastened to two opposite surfaces thereof.

Advantageous Effects

As described above, the present invention has a structure in which an accommodation hole 110a is formed to pass through a chuck main body 110, a first magnetic element 141 is exposed in the direction of the top surface of a chuck main body 110, and an AlNiCo magnet 120 is exposed in the direction of the bottom surface of the chuck main body 110, so that the respective objects 200 and 300 to be attached can be attached to the two opposite surfaces of the magnetic chuck 100, with the result that the magnetic chuck 100 can be used in various ways. Furthermore, the lateral part 112 of the chuck main body 110 is unnecessary, so that the weight of the magnetic chuck 100 itself is greatly reduced and thus the product cost is reduced, the thickness of the magnetic chuck 100 is reduced, and convenience of use can be greatly improved.

DESCRIPTION OF CHARACTERS OF PRINCIPAL ELEMENTS

100; magnetic chuck 100a; filling material
100b, 100c; reinforcing plates 110; chuck main body
110a; accommodation hole 110c; insertion hole
111; vertical part 120; AlNiCo magnet
130; coil 141, 142; magnetic elements
151, 152; ferrite (or rare-earth) magnets
160; ejection unit 161a, 161b; pushers
162; springs 170; coupling members
180; contact sensors 181; sensing units
190; support mechanism 191; jigs
192; springs 193; jig fastening members
200, 300; objects to be attached 300a; coupling holes

MODE FOR THE INVENTION

The present invention is described in detail with reference to the accompanying illustrative drawings.

FIGS. 3 to 10 are diagrams illustrating the present invention. The same reference numerals are used to designate the same portions as those of FIGS. 1 and 2, in which the prior art is shown, and a description of identical portions is omitted.

Figure 3:
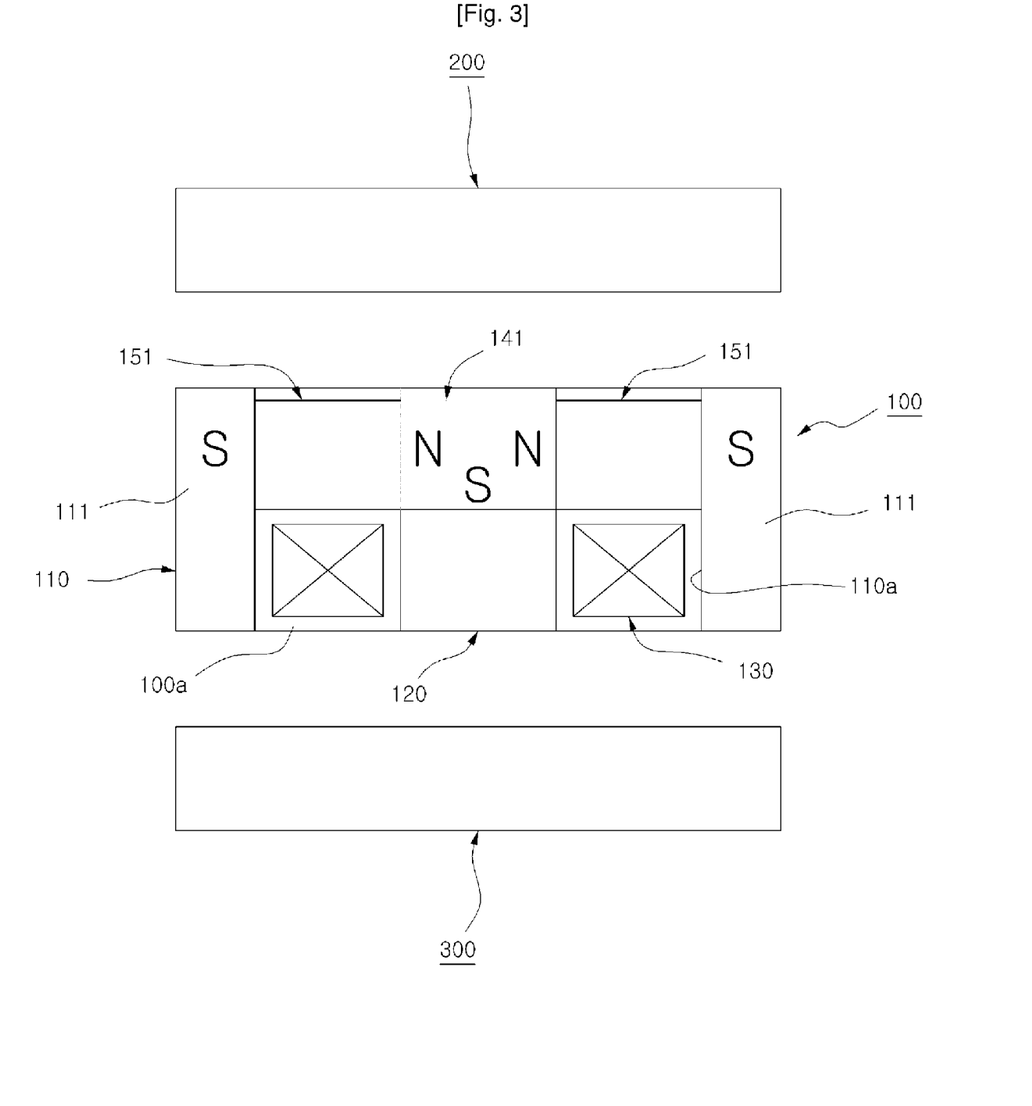
FIGS. 3 and 4 are diagrams showing a first embodiment of a magnetic chuck according to the present invention.
Figure 4:
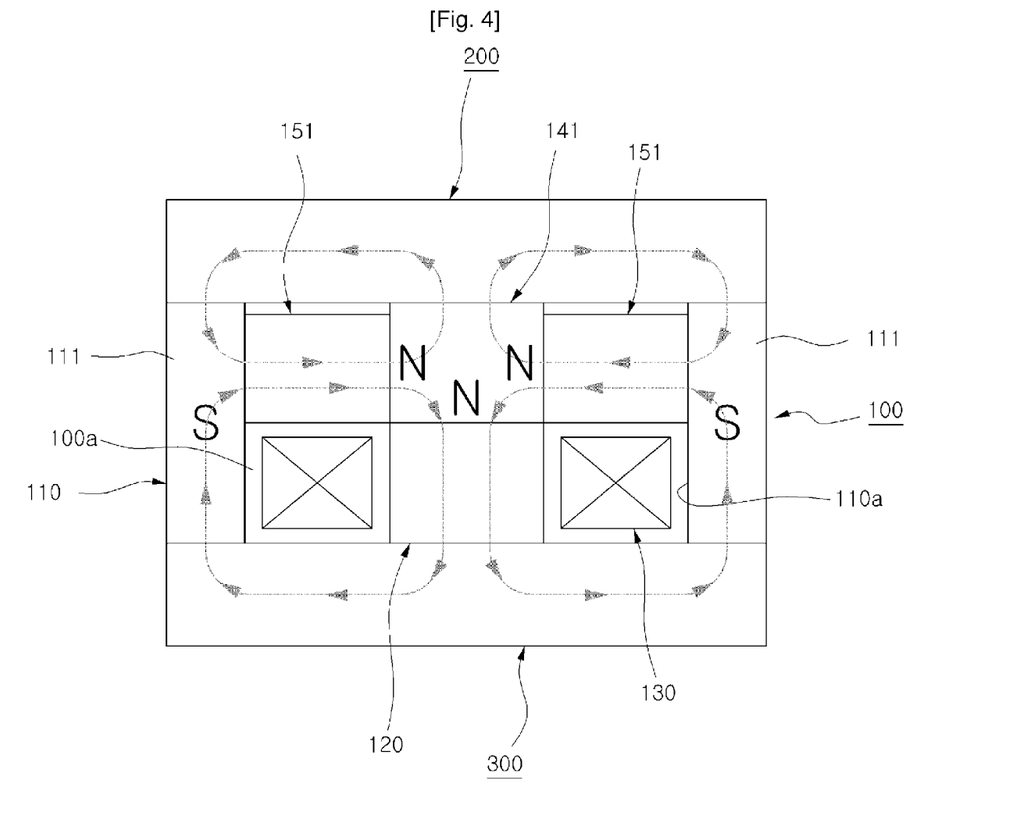

Referring to FIGS. 3 and 4, a magnetic chuck 100 according to the present invention includes a chuck main body 110 made of magnetic material and formed such that an accommodation hole 110a passes therethrough; an AlNiCo magnet 120 inserted into the accommodation hole 110a of the chuck main body 110; a coil 130 inserted into the accommodation hole 110a of the chuck main body 110 and configured to surround the AlNiCo magnet 120; a first magnetic element 141 inserted into the accommodation hole 110a of the chuck main body 110 and disposed above and adjacent to the AlNiCo magnet 120; and a first ferrite (or rare-earth) magnet 151 inserted into the accommodation hole 110a of the chuck main body 110 and disposed adjacent to the circumferential surface of the magnetic element 141.

Furthermore, the magnetic chuck 100 has a structure in which the elements 120, 130, 141 and 151, inserted into the accommodation hole 110a of the chuck main body 110, are bound together by filling material 100a and are mounted in the accommodation hole 110a of the chuck main body 110, the first magnetic element 141 is exposed in the direction of the top surface of the chuck main body 110, and the AlNiCo magnet 120 is exposed in the direction of the bottom surface of the chuck main body 110.

The operation of the magnetic chuck 100 according to a first embodiment thereof is described with reference to FIGS. 3 and 4 below.

In the present embodiment, the vertical part 111 of the chuck main body 110 is adjacent to only the first ferrite (or rare-earth) magnet 151, and thus all portions of the chuck main body 110 have an S polarity.

In this state, as shown in FIG. 3, when power is applied to the coil 130 and the AlNiCo magnet 120 is thus magnetized, the externally exposed surface of the AlNiCo magnet 120 has an S polarity, portions of the first magnetic element 141, which are adjacent to the first ferrite (or rare-earth) magnet 151 have an N polarity, and a portion of the magnetic element 141, which is adjacent to the first AlNiCo magnet 120, has an S polarity, so that an object 200 to be attached is not attached to the magnetic chuck 100 even when the object 200 or 300 to be attached is close to or in contact with the top or bottom surface of the magnetic chuck 100.

Thereafter, when power is applied to the coil 130 in a reverse direction, as shown in FIG. 4, the AlNiCo magnet 120 is inversely magnetized, so that all portions of the first magnetic element 141 are changed into an N-pole and the externally exposed surface of the AlNiCo magnet 120 is changed into an N-pole in the state in which the vertical part 111 of the chuck main body 110, which is adjacent to the first ferrite (or rare-earth) magnet 151, is kept magnetized as an S-pole. Accordingly, when the object 200 to be attached, such as a workpiece, is close to the top surface of the magnetic chuck 100, the object 200 to be attached is attached to the vertical part 111 of the chuck main body, which has an S polarity, and the first magnetic element 141, which has an N polarity. Furthermore, when the object 300 to be attached is close to the bottom surface of the magnetic chuck 100, the object 300 to be attached is attached to the vertical part 111 of the chuck main body, which has an S polarity, and the externally exposed surface of the AlNiCo magnet 120, which has an N polarity. When the attached object 200 is attached to the top surface of the magnetic chuck 100 by magnetic force, a closed loop is formed such that a line of magnetic force extends along the direction of the first magnetic element 141→the attached object 200→the chuck main body 110→the first ferrite (or rare-earth) magnet 151→the first magnetic element 141. Furthermore, when the attached object 300 is attached to the bottom surface of the magnetic chuck 100 by magnetic force, a closed loop is formed such that a line of magnetic force extends along the direction of the AlNiCo magnet 120→the attached object 300→the chuck main body 110→the first ferrite (or rare-earth) magnet 151→the first magnetic element 141→the AlNiCo magnet 120.

According to the present invention, the magnetic chuck 100 has a structure in which the accommodation hole 110a is formed to pass through the chuck main body 110, the first magnetic element 141 is exposed in the direction of the top surface of the chuck main body 110, and the AlNiCo magnet 120 is exposed in the direction of the bottom surface of the chuck main body 110, so that the respective object 200 and 300 to be attached can be attached to two opposite surfaces of the magnetic chuck 100, with the result that the magnetic chuck 100 can be used in various ways as needed.

Furthermore, the magnetic chuck 100 has a structure in which the accommodation hole 110a is formed to pass through the chuck main body 110, and the plurality of elements 120, 130, 141 and 151 are mounted in the accommodation hole 110a using the filling material 100a, so that the lateral part 112 (refer to FIGS. 1 and 2) of the chuck main body 110 is unnecessary, with the result that there are advantages in that the weight of the magnetic chuck 100 itself is reduced and the thickness thereof is reduced.

Figure 5:
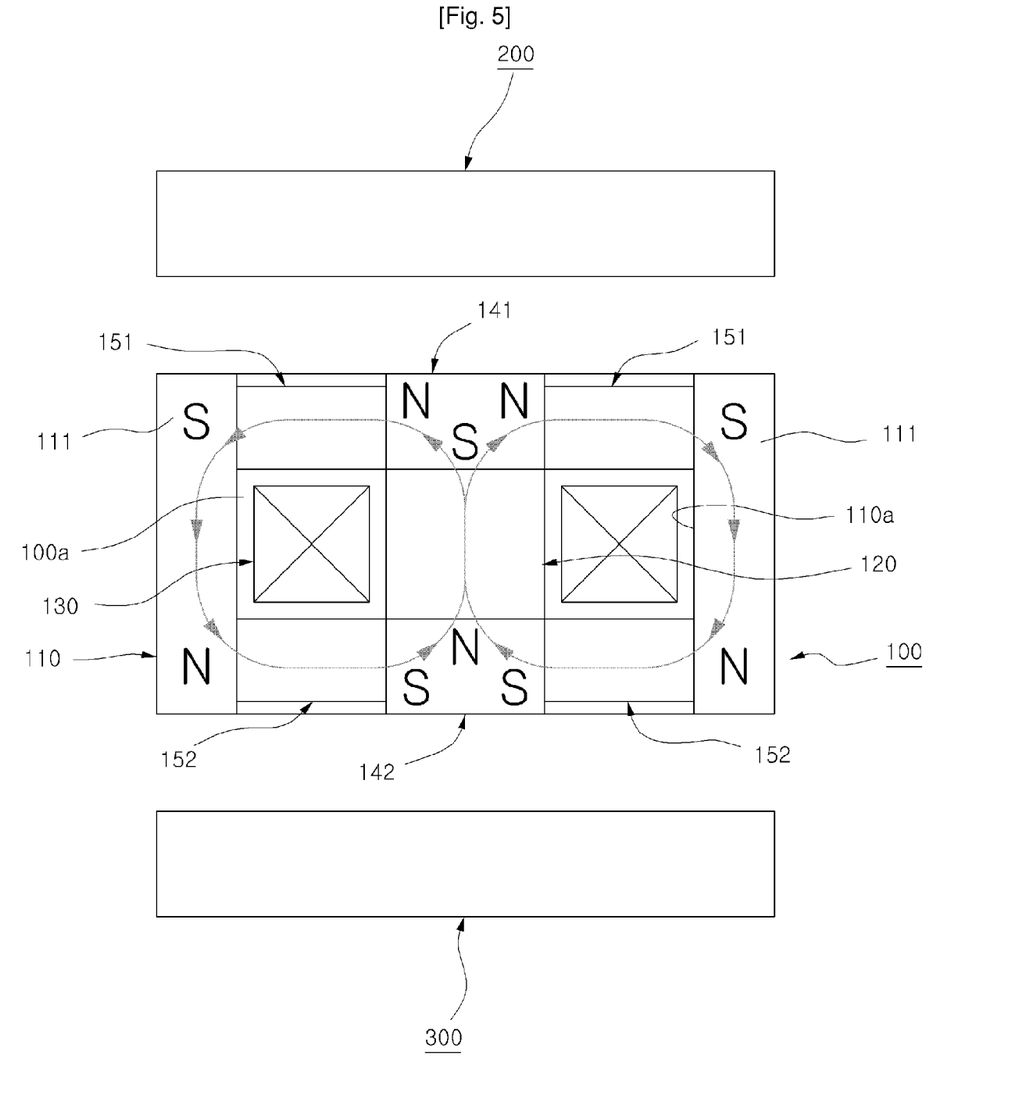
FIGS. 5 and 6 are diagrams showing a second embodiment of a magnetic chuck according to the present invention.
Figure 6:
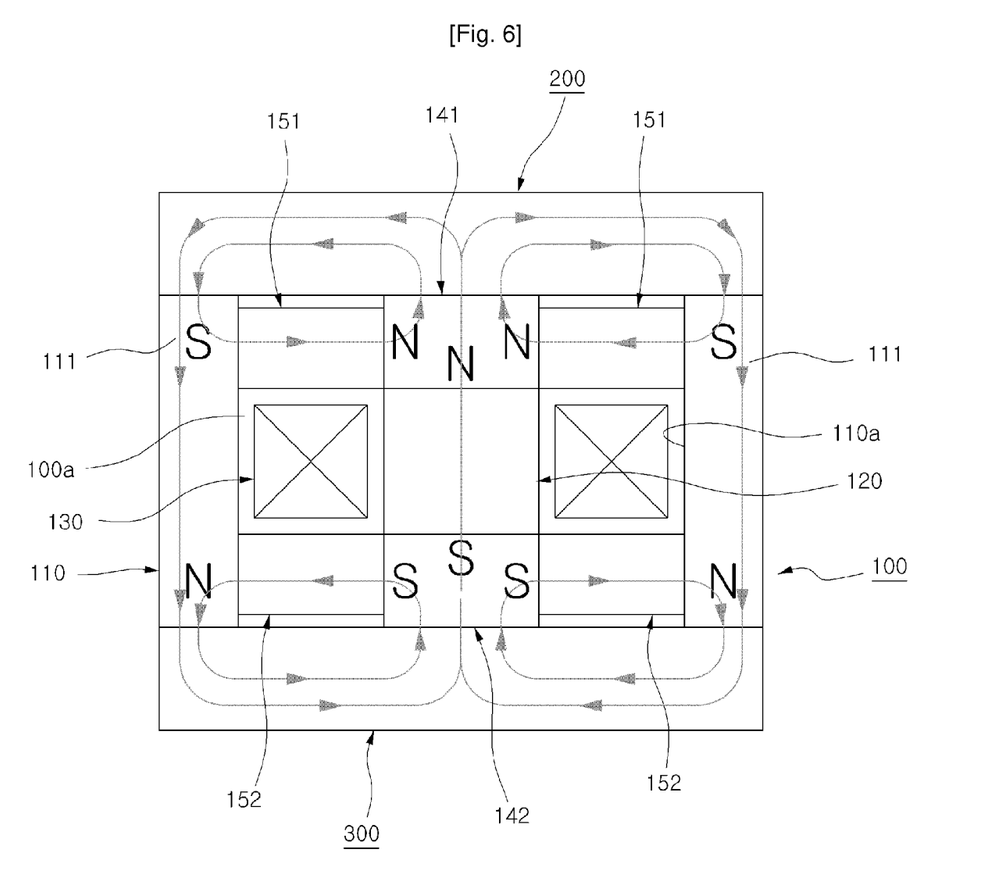

A magnetic chuck 100 according to a second embodiment shown in FIGS. 5 and 6 is additionally provided with a second magnetic element 142, which is inserted into the accommodation hole 110a of the chuck main body 110 and is disposed below and adjacent to the AlNiCo magnet 120; and a second ferrite (or rare-earth) magnet 152, which is inserted into the accommodation hole 110a of the chuck main body 110 and is disposed adjacent to the circumferential surface of the second magnetic element 142, wherein the first magnetic element is exposed in the direction of the top surface of the chuck main body, and the second magnetic element is exposed in the direction of the bottom surface of the chuck main body.

The operation of the magnetic chuck 100 according to the second embodiment is described with reference to FIGS. 5 and 6 below.

In the present embodiment, the vertical part 111 of the chuck main body 110 is adjacent to the first and second ferrite (or rare-earth) magnets 151 and 152, so that the upper portion of the vertical part 111, which is adjacent to the first ferrite (or rare-earth) magnet 151, has an S polarity, and the lower portion of the vertical part 111, which is adjacent to the second ferrite (or rare-earth) magnet 152, has an N polarity.

In this state, as shown in FIG. 5, when power is applied to the coil 130 and the AlNiCo magnet 120 is thus magnetized, portions of the first magnetic element 141, which are adjacent to the first ferrite (or rare-earth) magnet 151, have an N polarity, and a portion of the first magnetic element 141, which is adjacent to the AlNiCo magnet 120, has an S polarity, portions of the second magnetic element 142, which are adjacent to the second ferrite (or rare-earth) magnet 152, have an S polarity, and a portion of the second magnetic element 142, which is adjacent to the AlNiCo magnet 120, has an N polarity, so that an object 200 to be attached is not attached to the magnetic chuck 100 even when the object 200 or 300 to be attached is close to or in contact with the top or bottom surface of the magnetic chuck 100. Thereafter, when power is applied to the coil 130 in a reverse direction, as shown in FIG. 6, the AlNiCo magnet 120 is inversely magnetized, so that all portions of the first magnetic element 141 are changed into an N-pole, and all portions of the second magnetic element 142 are changed into an S-pole. Accordingly, when the object 200 to be attached, such as a workpiece, is close to the top surface of the magnetic chuck 100, the object 200 to be attached is attached to the top surface of the vertical part 111 of the chuck main body, which has an S polarity, and the first magnetic element 141, which has an N polarity. Furthermore, when the object 300 to be attached is close to the bottom surface of the magnetic chuck 100, the object 300 to be attached is attached to the bottom surface of the vertical part 111 of the chuck main body, which has an N polarity, and the second magnetic element 142, which has an S polarity. When the object 200 to be attached has been attached the top surface of magnetic chuck 100 by magnetic force, a closed loop is formed such that a line of magnetic force extends along the direction of the first magnetic element 141→the attached object 200→the chuck main body 110→the first ferrite (or rare-earth) magnet 151→the first magnetic element 141. Furthermore, when the object 300 to be attached is attached to the bottom surface of the magnetic chuck 100 by magnetic force, a closed loop is formed such that a line of magnetic force extends along the direction of the chuck main body 110→the attached object 300→the second magnetic element 142→the second ferrite (or rare-earth) magnet 152→the chuck main body 110. Furthermore, when the respective objects 200 and 300 to be attached are attached to the top and bottom surfaces of the magnetic chuck 100 according to the present embodiment, a closed loop is formed such that a line of magnetic force extends along the direction of the first magnetic element 141→the attached object 200→the chuck main body 110→the attached object 300→the second magnetic element 142→the AlNiCo magnet 120→the first magnetic element 141, so that a high magnetic force is generated, therefore improving the ability of the magnetic chuck 100 to hold the attached objects thereto.

Figure 7:
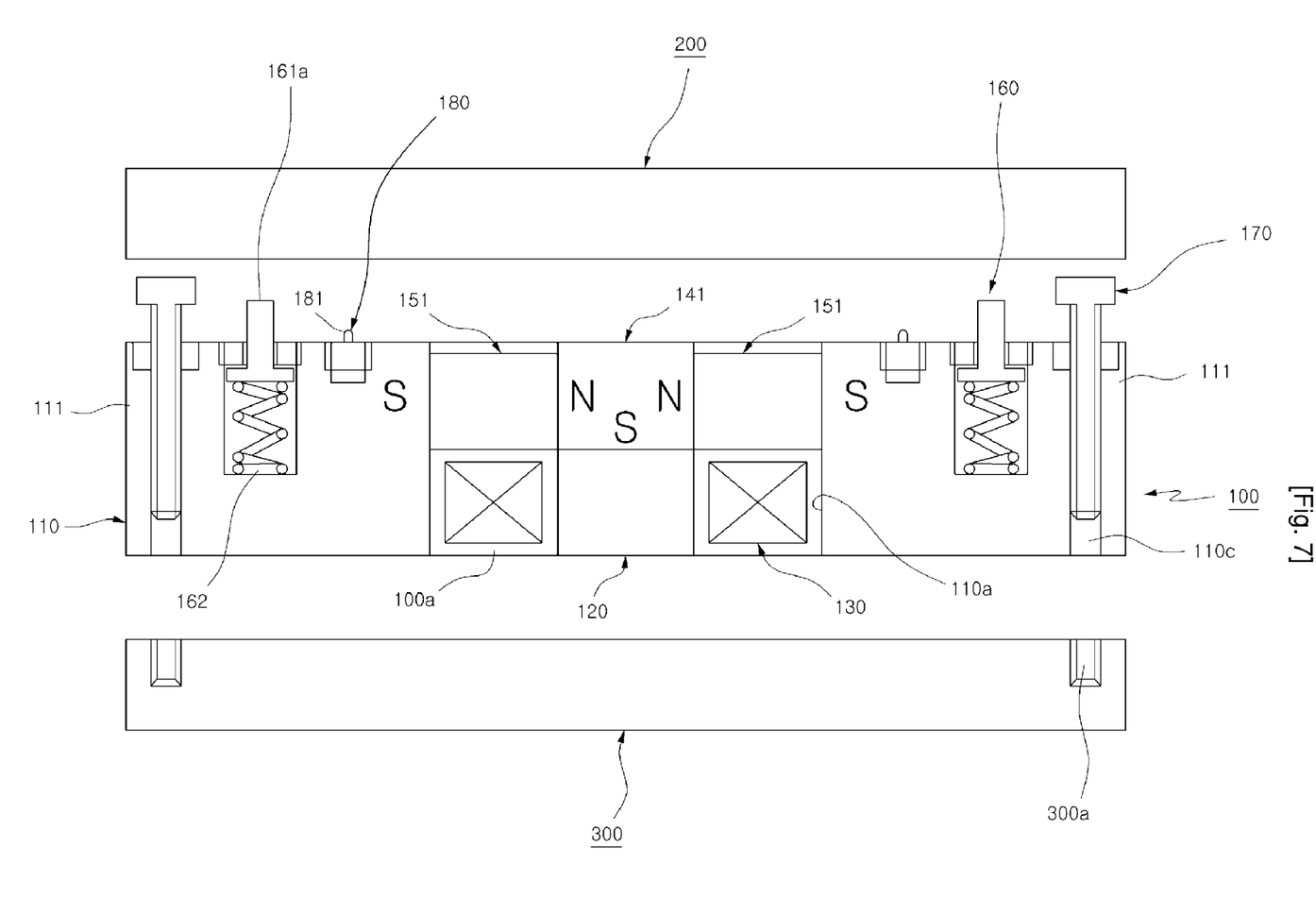
FIGS. 7 and 8 are diagrams showing a third embodiment of a magnetic chuck according to the present invention.
Figure 8:
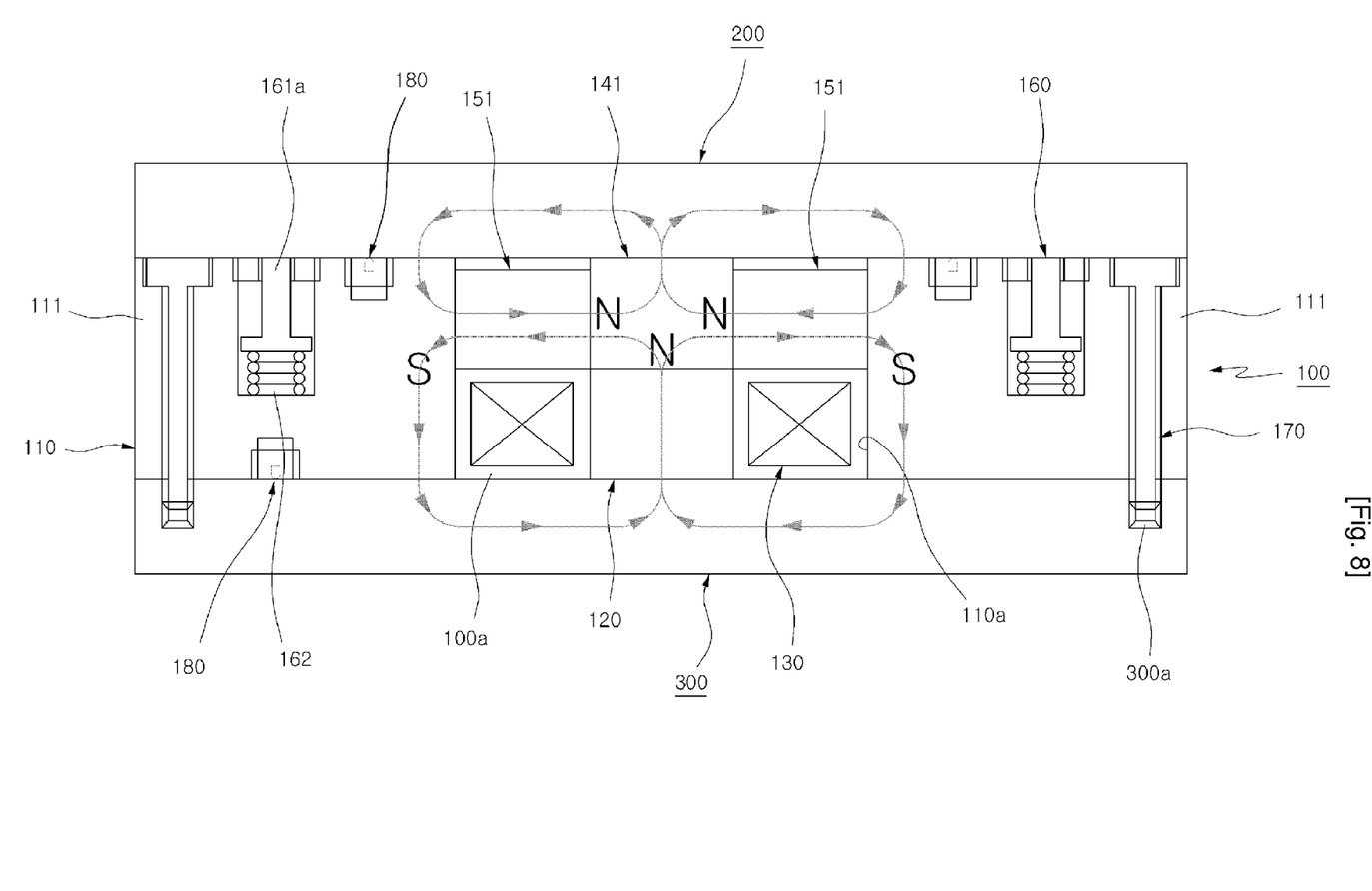
Figure 9:
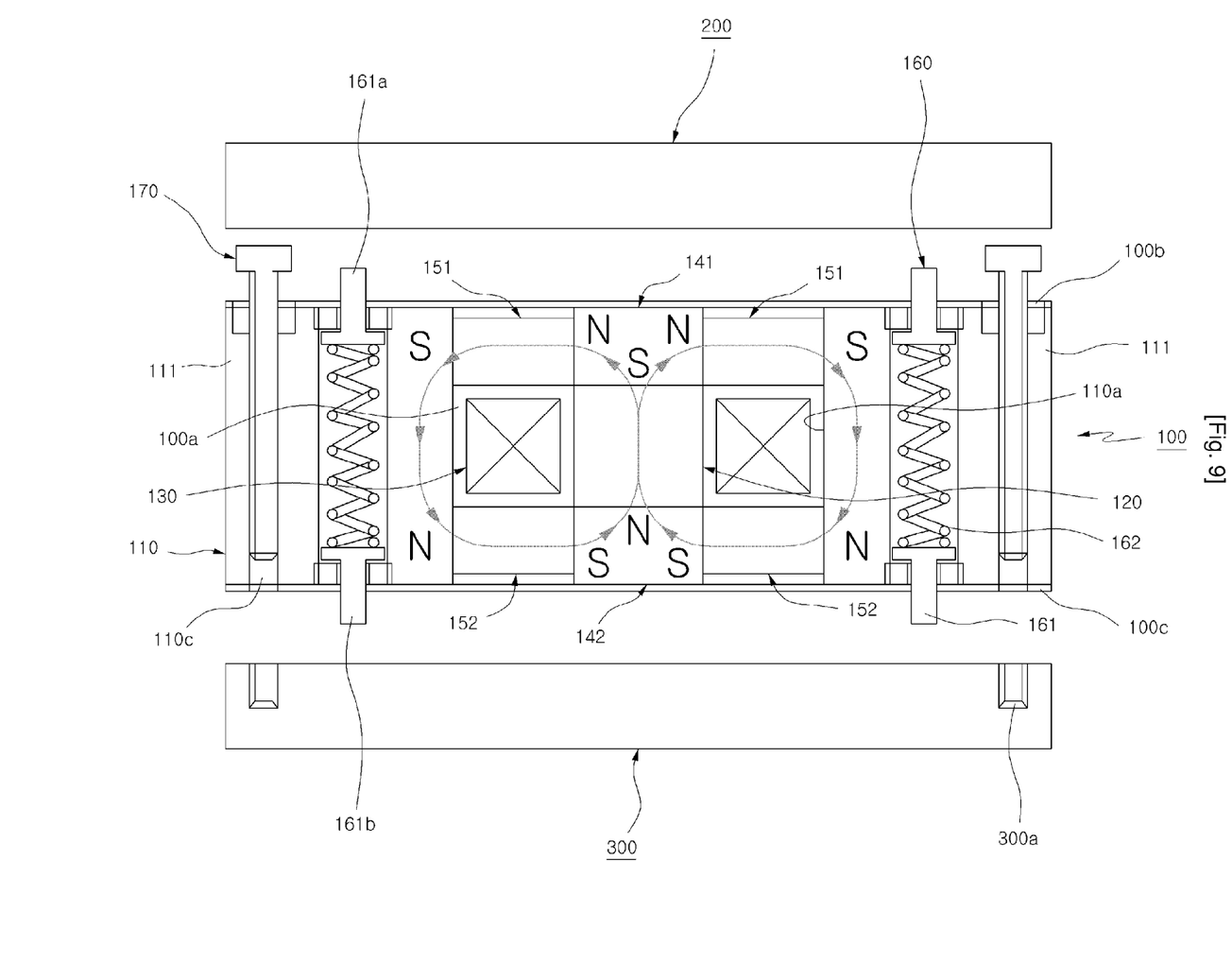
FIGS. 9 and 10 are diagrams showing a fourth embodiment of a magnetic chuck according to the present invention.
Figure 10:
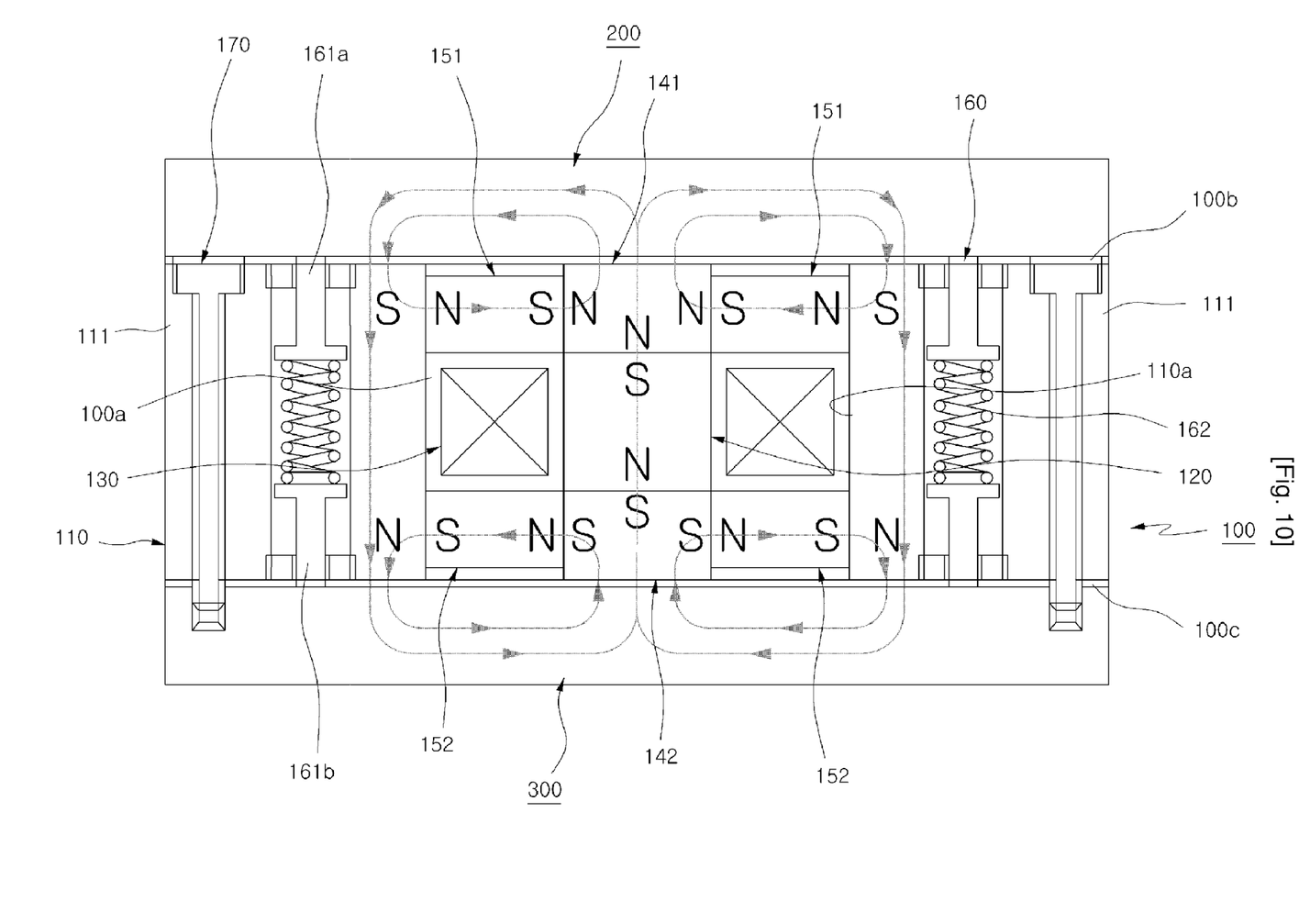

In the cases of a third embodiment, shown in FIGS. 7 and 8, and a fourth embodiment, shown in FIGS. 9 and 10, ejection units 160, which are installed in the chuck main body 110 and elastically support the attached objects 200 and 300 outward, are additionally provided.

In the third embodiment, shown in FIGS. 7 and 8, ejection units 160, each of which includes a first pusher 161a installed in the vertical part 111 of a chuck main body 110 so as to rectilinearly reciprocate and configured to protrude outside the vertical part 111 of the chuck main body 110; and a spring 162 installed in the vertical part 111 of the chuck main body 110 and configured to elastically support the first pusher 161a in a single direction, are employed. In the fourth embodiment of FIGS. 9 and 10, ejection units 160, each of which includes first and second pushers 161a, and 161b formed as a pair, installed in the vertical part 111 of a chuck main body 110 so as to rectilinearly reciprocate, and disposed opposite each other to protrude outside of the vertical part 111 of the chuck main body 110; and a spring 162 installed in the vertical part 111 of the chuck main body 110, disposed between the first and second pushers 161a and 161b, and configured to elastically support the first and second pushers 161a and 161b in a single direction, are employed. However, the present invention is not limited thereto, and all well-known units that can elastically support attached objects 200 and 300 outside the chuck main body 110 may be used as the ejection units 160.

For reference, even when magnetic force is generated by the magnetic chuck 100 to attach the objects 200 and 300 to be attached to the magnetic chuck 100 and then the magnetic force of the magnetic chuck 100 is removed in order to separate the attached objects 200 and 300 from the magnetic chuck 100, the magnetic force remains in the magnetic chuck 100 and the attached objects 200 and 300. Consequently, a considerable force is required to separate the attached objects 200 and 300, attached to the magnetic chuck 100 by the residual magnetic force, from the magnetic chuck 100. However, when the ejection units 160 are installed in the chuck main body 110, as in the present embodiment, the attached objects 200 and 300 are pushed outside the chuck main body 110 by the ejection units 160, so that the attached objects 200 and 300 can be automatically separated from the chuck main body 110 or the separation of the attached objects 200 and 300 can be easily achieved using a small amount of force.

Meanwhile, as shown in FIGS. 7 and 8, when contact sensors 180 for detecting whether contact with the attached object 200 or 300 has been made are installed in the chuck main body 110, the main controller (not shown) of a machining tool can receive output signals from the contact sensors 180 and can determine whether the attached object 200 or 300 is closely adhered to the magnetic chuck 100.

In the present embodiment, button switch-type sensors for interrupting the output of contact signals to the main controller of the machining tool when the sensing units 181, which are elastically supported by respectively corresponding springs (not shown) in a single direction, are protruded outside of the magnetic chuck 100 by the restoring force of the springs, as shown in FIG. 7, and outputting contact signals to the main controller of the machining tool when the sensing units 181, which are elastically supported by the springs, are pressed, as shown in FIG. 8, are used as the contact sensors 180.

Figure 11:
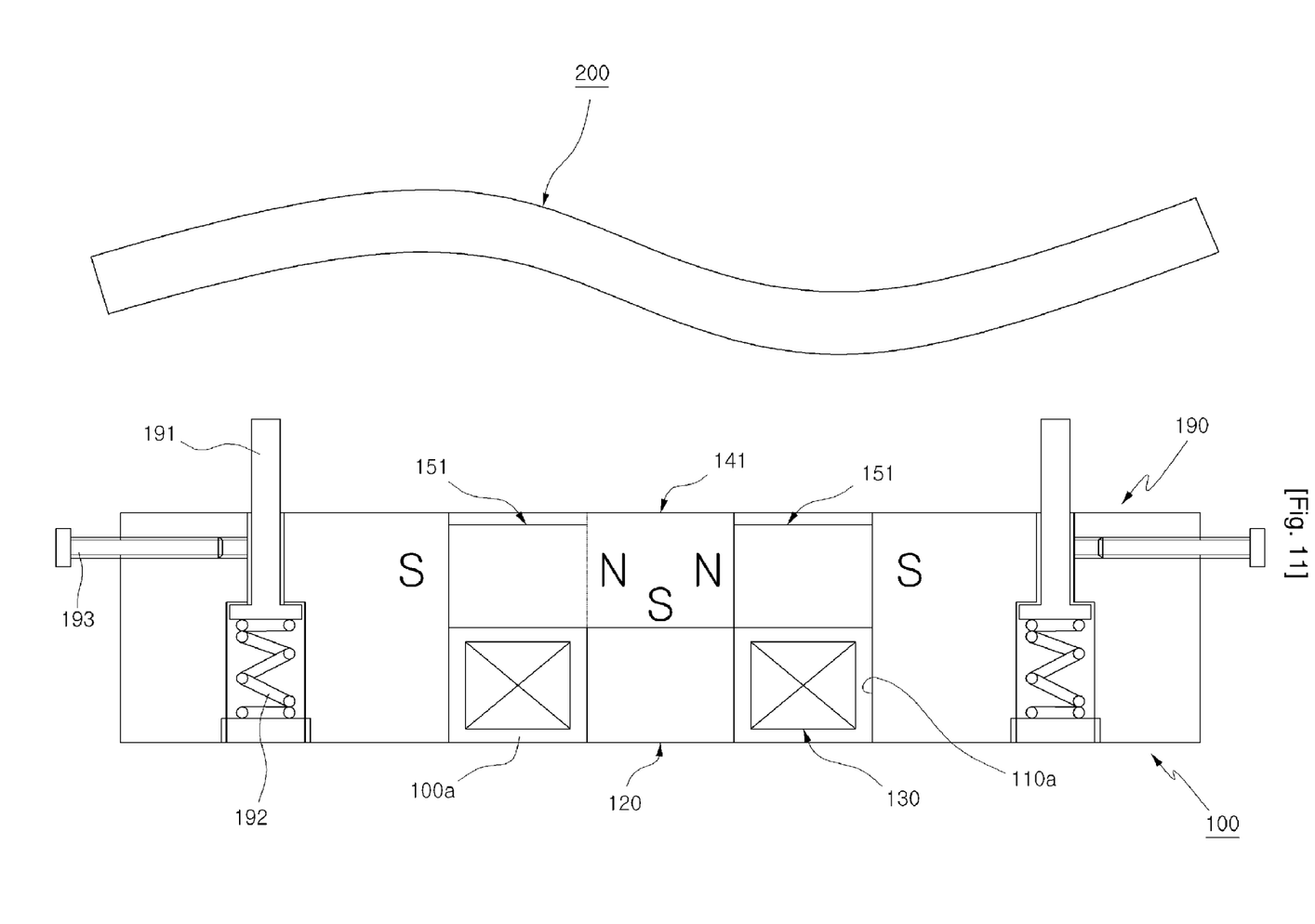
FIGS. 11 and 12 are diagrams showing a fifth embodiment of a magnetic chuck according to the present invention.
Figure 12:
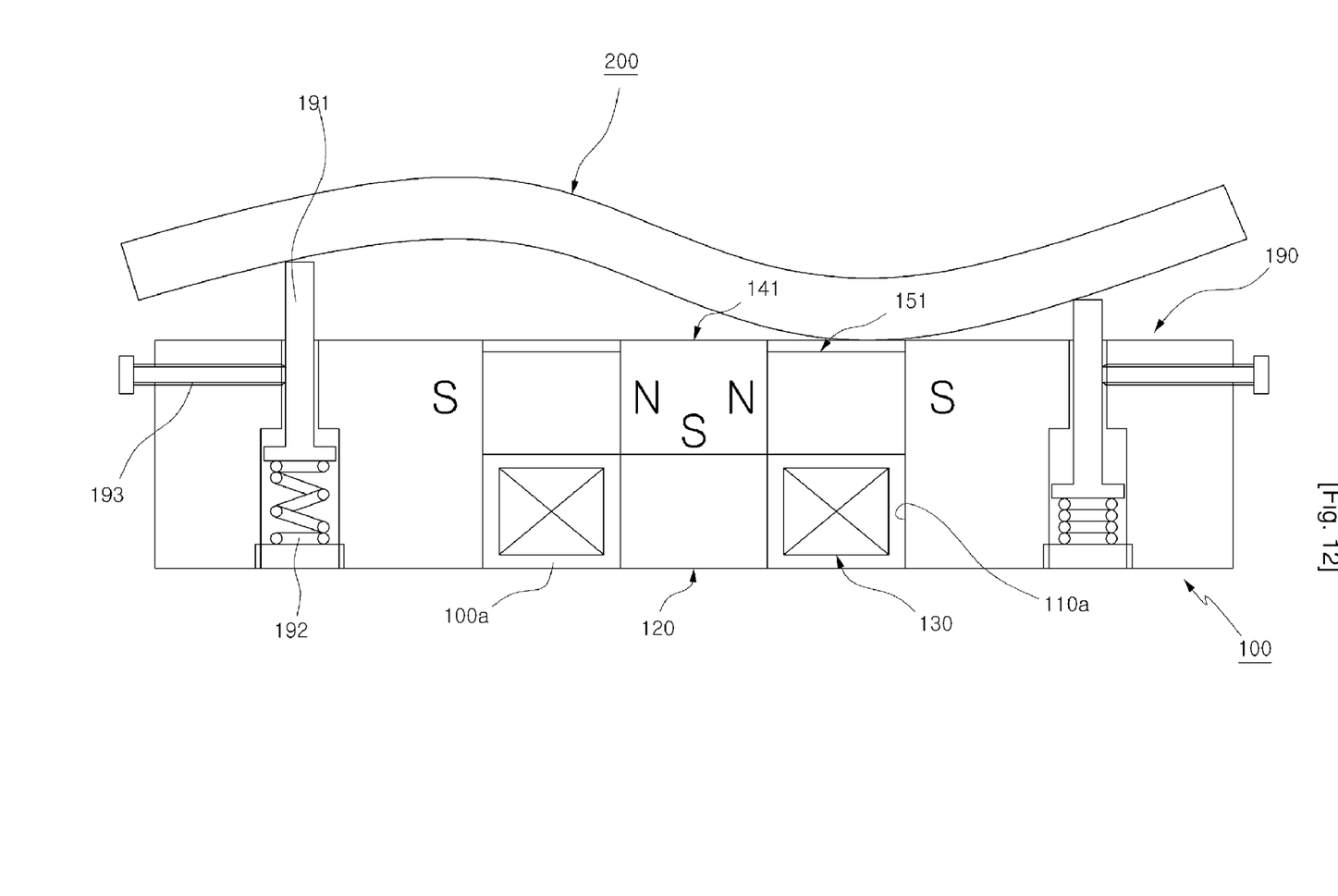

In a fifth embodiment, shown in FIGS. 11 and 12, a support mechanism 190, which is installed in a chuck main body 110 and supports an attached object 200, is additionally provided.

In the present embodiment, the support mechanism 190, which includes jigs 191 installed in the vertical part 111 of the chuck main body 110 so as to rectilinearly reciprocate and configured to protrude outside the vertical part 111 of the chuck main body 110; springs 192 installed in the vertical part 111 of the chuck main body 110 and configured to elastically support the respective jigs 191 in a single direction; and jig fastening members 193 coupled to the chuck main body 110 in a screwed manner and configured to press and fasten the respective jigs 191, are employed.

In this manner, when the support mechanism 190 is additionally installed in the chuck main body 110, an object 200 to be attached having an uneven attachment surface can be safely and easily attached to the magnetic chuck 100.

The present invention is not limited to the above-described embodiments, and may be modified and implemented in various ways within a range that does not depart from the following claims.

As an example, the object 200 and 300 to be attached may be attached to the magnetic chuck 100 or the attached objects 200 and 300 may be separated from the magnetic chuck 100 while the magnetism of the AlNiCo magnet 120 is altered in the state in which the magnetism of the ferrite (or rare-earth) magnets 151 and 152 is inverted and the magnetism of the chuck main body 110 adjacent thereto is also inverted. In this case, the magnetism of each of the elements 110, 120, 141, 142, 151 and 152 is opposite that of the embodiments shown FIGS. 1 to 10.

Furthermore, as shown in FIGS. 9 and 10, it is preferred that respective thin reinforcing plates 100b and 100c be mounted on the top and bottom surfaces of the magnetic chuck 100, and thus no damage occur even when the top and bottom surfaces of the magnetic chuck 100 come into direct contact with the respective objects 200 and 300 to be attached. It is preferred that the strength of the reinforcing plates 100b and 100c be excellent and the thickness thereof be further reduced.

The invention claimed is:

1. A magnetic chuck, the magnet chuck having a structure in which elements inserted into an accommodation hole of a chuck main body are bound together by filling material and are mounted in the accommodation hole of the chuck main body, the magnetic chuck comprising:
a chuck main body made of magnetic material and provided with a accommodation hole;
an AlNiCo magnet inserted into the accommodation hole of the chuck main body;
a coil inserted into the accommodation hole of the chuck main body and configured to surround the AlNiCo magnet;
a first magnetic element inserted into the accommodation hole of the chuck main body and disposed above and adjacent to the AlNiCo magnet; and
a first ferrite or rare-earth magnet inserted into the accommodation hole of the chuck main body and disposed adjacent to a circumferential surface of the first magnetic element;
wherein the accommodation hole is formed to pass through the chuck main body, the first magnetic element is exposed in a direction of a top surface of the chuck main body, and the AlNiCo magnet is exposed in a direction of a bottom surface of the chuck main body.

2. A magnetic chuck, the magnet chuck having a structure in which elements inserted into an accommodation hole of a chuck main body are bound together by filling material and are mounted in the accommodation hole of the chuck main body, the magnetic chuck comprising: a chuck main body made of magnetic material and provided with a accommodation hole; an AlNiCo magnet inserted into the accommodation hole of the chuck main body; a coil inserted into the accommodation hole of the chuck main body and configured to surround the AlNiCo magnet; a first magnetic element inserted into the accommodation hole of the chuck main body and disposed above and adjacent to the AlNiCo magnet; and a first ferrite or rare-earth magnet inserted into the accommodation hole of the chuck main body and disposed adjacent to a circumferential surface of the first magnetic element; further comprising a second magnetic element, which is inserted into the accommodation hole of the chuck main body and is disposed below and adjacent to the AlNiCo magnet; and a second ferrite or rare-earth magnet, which is inserted into the accommodation hole of the chuck main body and is disposed adjacent to a circumferential surface of the second magnetic element; wherein the accommodation hole is formed to pass through the chuck main body, the first magnetic element is exposed in the direction of the top surface of the chuck main body, and the second magnetic element is exposed in a direction of a bottom surface of the chuck main body.

3. The magnetic chuck according to claim 1 or 2, further comprising ejection units that are installed in the chuck main body and elastically support an attached object outward.

4. The magnetic chuck according to claim 1 or 2, further comprising contact sensors that are installed in the chuck main body and detect whether contact with an attached object has been made.

5. The magnetic chuck according to claim 1 or 2, further comprising a support mechanism that is installed in the chuck main body and supports an attached object.

\* \* \* \* \*